Oct. 30, 1951
A. ŠPAČEK
2,572,958
METHOD FOR INCREASING THE DEVIATION OF FREQUENCY MODULATED OSCILLATIONS
Filed Aug. 10, 1948
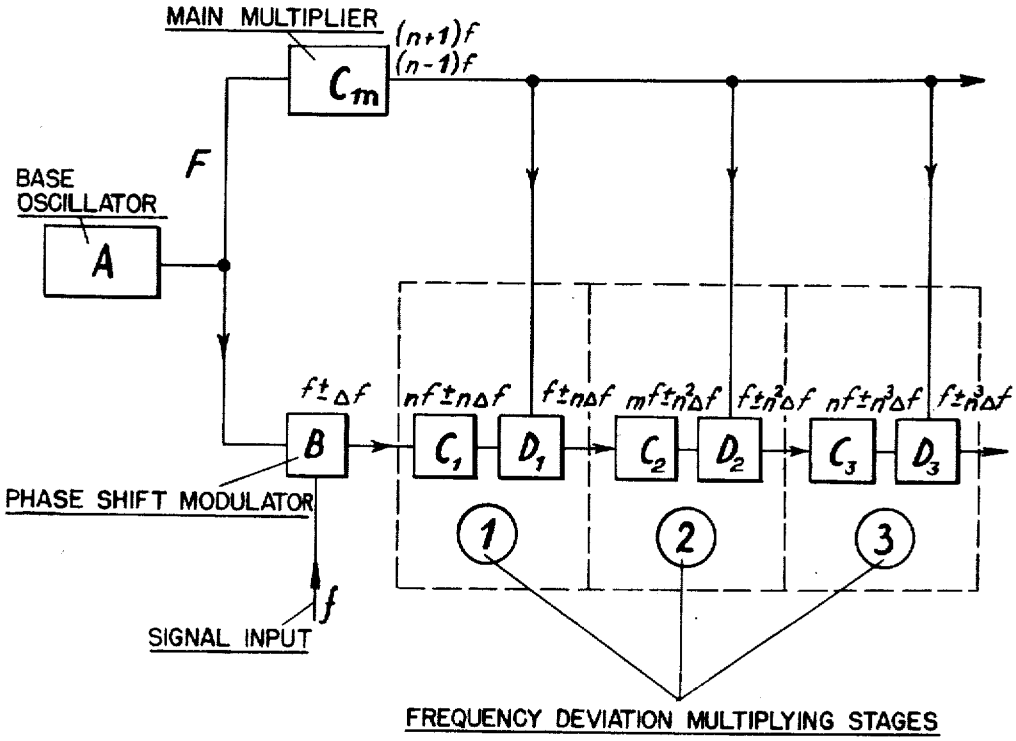
$C_1, C_2, C_3, \ldots$ = MULTIPLIERS
$D_1, D_2, D_3, \ldots$ = CONVERTERS
Inventor:
Antonin Špaček
By
Attorney Patented Oct. 30, 1951 2,572,958

UNITED STATES PATENT OFFICE 2,572,958

METHOD FOR INCREASING THE DEVIATION OF FREQUENCY MODULATED OSCILLATIONS

Antonín Špaček, Prague-Branik, Czechoslovakia, assignor of one-half to Tesla, National Corporation, Prague, Czechoslovakia Application August 10, 1948, Serial No. 43,355
In Czechoslovakia August 19, 1947

6 Claims. (Cl. 332—22)

This invention relates to frequency modulated signalling and, more particularly, to an improved and simplified method of and apparatus combining maximum stability and accuracy of the center of basic output frequency with frequency deviation of a large magnitude.

In phase modulation, only a relatively small initial deviation from the base frequency can be obtained, so that it is necessary to increase or multiply this deviation before the signal modulations leave the output stage in order to obtain the desired frequency change at the radiated frequency. Such multiplication, in arrangements previously proposed, has resulted in an undesired multiplication of any initial small irregularities in the basic frequency, which is usually derived from a controlled oscillator. Additionally, the arrangements hitherto used have involved unduly complicated arrangements of components.

In accordance with the present invention, any desired multiplication of the initial frequency deviation is obtained, without multiplication of irregularities in the basic frequency, in a novel and simple manner. Any irregularities in the oscillator frequency appear only in the same order of magnitude in the output frequency, such irregularities not being multiplied in the frequency deviation multiplier stages.

More specifically, the basic frequency develops by a controlled oscillator, for example, is fed to a main multiplier having an output of $n\pm1$ times the initial frequency. The oscillator frequency is also fed to a phase shift modulator where it is modulated with the output of an audio amplifier and correction system producing a deviation frequency $\Delta f$.

The output $f\pm\Delta f$ of the phase shift modulator is fed through a plurality of identical frequency deviation multiplying stages. At each stage, the modulated output is fed to a multiplier to produce a multiplier output of $nf\pm n\Delta f$, which is combined in a converter with the output of the main multiplier, $(n\pm1)f$. The resultant output of each frequency deviation stage is fed to the multiplier of the next stage, where it is multiplied again and again combined with the output of the main multiplier.

In the first frequency deviation stage, the resultant output of the converter is the base frequency, $f$, plus or minus the multiplied frequency deviations, $n\Delta f$. After $k$ stages, the output of the converter will, therefore, be $f\pm n^k\Delta f$, or the initial frequency plus or minus the multiplication factor, raised to the power equalling the number of stages, times the frequency deviation. Thus, the initial frequency, and any errors therein, is not changed, while the desired multiplication of the frequency deviation is effected by using a plurality of identical frequency deviation multiplier stages, the latter thus greatly simplifying the system and its maintenance and repair.

With the foregoing in mind, it is an object of the present invention to provide, in frequency modulated signalling, an improved method of multiplying frequency deviations while maintaining a stable and accurate base or central frequency.

Another object is to provide an arrangement for performing such method and including a selected number of frequency deviation multiplier stages.

These and other objects, advantages and novel features of the invention will be apparent from the following description and the accompanying drawing. In the drawing, the single figure is a schematic block diagram of a frequency modulated signalling system embodying the invention.

Referring to the drawing, the base or central frequency $f$ is provided at the output of a crystal stabilized oscillator A, for example, and is applied to a phase shift modulator B and a main multiplied $C_m$, each of any desired conventional construction. The audio modulations are applied through an audio correction system amplifier to modulator B, where they result in an initial frequency deviation $\Delta f$ which, combined with base frequency f, produces a modulator output signal $f\pm\Delta f$.

This latter signal is fed to the multiplier $C_1$ of a first frequency deviation multiplying stage 1 where the signal is multiplied $n$ times. The output of multiplier $C_1$ equal to $nf\pm n\Delta f$, is fed to the converter $D_1$ of stage 1.

The frequency $f$ fed to main multiplier $C_m$ is multiplied to a value equal to $(n+1)$ or $(n-1)f$, the multiplier thus being one more or one less than the multiplier in stage 1. The signal $(n+1)f$ or $(n-1)f$ is fed to converter $D_1$, which has an output tuned to a frequency of the order of the fundamental or base frequency $f$. When the two input signals are combined in converter $D_1$, the resultant output signal is $f\pm n\Delta f$, or the fundamental frequency $f$ modulated by the multiplied frequency deviation equal to $n\Delta f$.

The output signal of converter $D_1$ is fed to the multiplier $C_2$ of a second frequency deviation multiplying stage 2 having a converter $D_2$. Multiplier $C_2$ is identical with multiplier $C_1$, and converter $D_2$ is identical with converter $D_1$. The output signal $nf \pm n^2\Delta f$ of multiplier $C_2$ is applied to converter $D_2$ where it is combined with the unmodulated, multiplied base frequency $(n+1)f$ or $(n-1)f$ from main multiplier $C_m$ to produce a converter output signal $f \pm n^2\Delta f$.

The multiplication and conversion is repeated in the same manner in as many identical frequency deviation multiplier stages 1, 2, 3, and up to $x$ as necessary, to obtain the desired multiplication of the frequency deviation. At the final stage, $x$, the modulated converter output signal will thus be $f \pm n^x f$, on the fundamental frequency $f$, modulated by the initial frequency deviation multiplied by the stage multiplication factor raised to a power equal to the number of stages. Thus, the center, base, or fundamental frequency is kept at its initial value and, not being multiplied, any initial irregularities likewise are not multiplied, thereby affording a stabilized and accurate fundamental output frequency.

With the invention system, the frequency deviation is thus geometrically increased in a series of identical stages, with the fundamental frequency remaining stabilized. If the fundamental frequency $f$ is lower than the required final frequency, it may be increased to the desired value by suitable multipliers, such as doublers or triplers, included in the output of the last stage.

As the filtering of harmonic frequencies becomes more difficult with an increase in the order of the harmonics, it is preferable to use a multiplier factor $n$ sufficiently low to ensure reliable operation and low distortion. For example, the multipliers $C_1$, $C_2$, $C_3$, up to and including $C_x$ 4 may be doublers, producing a factor 2.

While a specific embodiment of the invention has been shown and described in detail to illustrate the application of the invention principles, it should be understood that the invention may be otherwise embodied without departing from such principles.

I claim:

1. A method of increasing the frequency deviation of a frequency modulated signal which comprises modulating the fundamental frequency with a frequency deviation; multiplying the modulated frequency a pre-set number of times; separately multiplying the unmodulated fundamental frequency a number of times differing by one from such pre-set number; combining the multiplied modulated frequency with the multiplied fundamental frequency to produce a signal corresponding to the fundamental frequency modulated by the multiplied frequency deviation; multiplying such lastly modulated signal such pre-set number of times; combining the multiplied fundamental frequency with the lastly multiplied modulated signal to produce a second signal equal to the fundamental frequency modulated by the deviation frequency multiplied by the square of such pre-set number; and continuing such multiplication of the modulated signals and combining thereof with the multiplied fundamental frequency in successive identical steps to produce a final output signal equal to the fundamental frequency modulated by the initial frequency deviation multiplied by such pre-set number raised to a power equal to the number of steps.

2. A method of increasing the frequency deviation of a frequency modulated signal which comprises modulating the fundamental frequency with a frequency deviation; successively multiplying the modulated frequency the same pre-set number of times in successive steps; separately multiplying the unmodulated fundamental frequency a number of times differing by one from such pre-set number; and, in each step, combining the multiplied modulator frequency with the multiplied fundamental frequency to produce a final output signal equal to the fundamental frequency modulated by the initial frequency deviation multiplied by such pre-set number raised to a power equal to the number of steps.

3. A frequency modulated signalling system comprising in combination, a controlled source of a fundamental frequency; means for modulating the fundamental frequency with a frequency deviation; a plurality of successive identical stages, each comprising a frequency multiplier and a converter, the stage multipliers having identical multiplication factors; means applying the modulated fundamental frequency to the input of the first stage multiplier; means applying the output of the multiplier of each stage to the input of the converter thereof; means applying the unmodulated fundamental frequency from the source to a main frequency multiplier having a multiplication factor differing by one from that of the multipliers of said stages; means applying the multiplied unmodulated fundamental frequency to the input of each converter; and means applying the output of each converter except that of the final stage to the input of the multiplier of the following stage; whereby to produce a final output signal equal to the fundamental frequency modulated by the initial frequency deviation multiplied by the stage multiplication factor raised to a power equal to the number of stages.

4. A system as claimed in claim 3 in which the source of fundamental frequency is a controlled oscillator.

5. A system as claimed in claim 3 in which the output of each converter is tuned to a frequency of the order of the fundamental frequency.

6. A system as claimed in claim 3 in which the stage multipliers are frequently doublers.

ANTONÍN ŠPAČEK.

REFERENCES CITED

The following references are of record in the file of this patent:

UNITED STATES PATENTS

| Number | Name | Date |
|---|---|---|
| 2,289,041 | Roberts | July 7, 1942 |
| 2,290,159 | Armstrong | July 21, 1942 |
| 2,335,934 | Goldstine | Dec. 7, 1943 |
| 2,358,382 | Carlson | Sept. 19, 1944 |

Certificate of Correction

Patent No. 2,572,958 October 30, 1951

ANTONÍN ŠPAČEK

It is hereby certified that error appears in the printed specification of the above numbered patent requiring correction as follows:

Column 3, line 36, after "$C_x$" strike out the numeral "4"; column 4, line 55, for "frequently" read *frequency*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*